8185X

C. Evans,

Steam Safety Valve.

Patented May 8, 1834.

AM. PHOTO-LITHO. CO. N.Y. (OSBORNE'S PROCESS.)

Cadwallader Evans of Philadelphia

Letters Patent

The Schedule referred to in these Letters Patent and making part of the same containing a description in the words of the said Cadwallader Evans himself of his improvement in the mode of applying a fusible alloy as a guard against explosions of Steam Engine and other Boilers.

Figure 1:
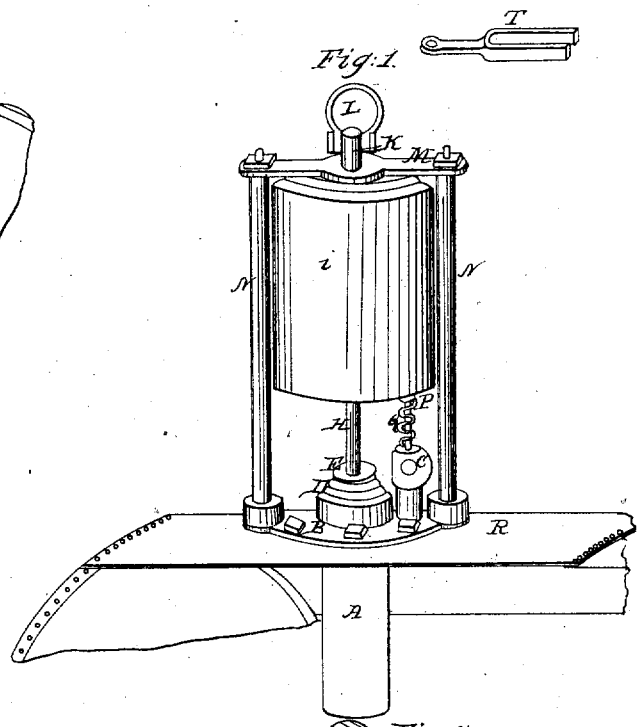

To all to whom these presents shall come: Be it known that I Cadwallader Evans of the City of Philadelphia in the County of Philadelphia and State of Pennsylvania have invented a new and useful improvement in the mode of applying a fusible alloy as a guard against explosions of Steam Engine and other Boilers, and that the following is a full and exact description of the construction and operation of the machinery or apparatus invented by me for that purpose, and which is also exhibited in the accompanying drawings under two modifications thereof. These drawings appertaining to and making a part of my Specification. Fig 1. & 2. represent the same machine, the former in perspective and the latter in section, the same letters referring in each to the same parts.

A. is a tube of Brass or other metal about five inches long and about one and a quarter inch bore, and one eighth thick at its sides and bottom. B is a flanch or plate of the same metal about five inches diameter and three eighths thick. C is a valve cock projecting about one and a half inch above the flanch & about three quarters of an inch below the bottom of it: this cock has a hole thro' it of about two tenths of an inch diameter.

all the above described parts are best formed in one casting.

D. is a plug of brass or other metal screwed into the top of the tube A. E is screwed into the plug D forming with it a stuffing Box, within this stuffing Box I place some suitable packing so as to exclude the air from the interior of the tube A. F is a lump or mass of fusible alloy that will melt at the required temperature.
G is a button or piece of brass or iron, about three quarters of an inch
in diameter and resting on the alloy. H is a brass or iron stem
about three eighths in diameter, which is fastened to G and pas-
ses through the stuffing Box, and is screwed into the bottom of
I. a weight which may be equal to thirty pounds. more or less.
K is a round piece of metal of about half an inch in diameter
screwed into the top of the weight I. — L. is a handle for the pur-
pose of raising the weight when required. M. is a guard placed across
the top of the weight and about a quarter of an inch above it.
When the weight is supported by the piece G as it rests on the
alloy, the top of the guard should be about half an inch below
the bottom of the handle L. so that when the alloy melts, the
weight will descend until the handle will rest on the guard;
this guard is also intended to keep the weight in its upright
position by means of the round iron piece K. passing thro. a
hole in the centre of said guard. N.N. are two Rods about half
an inch in diameter which are fastened to the flanch B. and
are of sufficient length to support the guard M. O is a small
valve fitted to the bottom of the valve cock, to this valve is secu-
red a small stem which passes thro' the cock and extends up to
within about a quarter of an inch of the bottom of the weight;
on the top of this stem is a button of metal P. which may be
about half an inch in diameter. Q is a spiral spring for
the purpose of keeping the valve up to its place. R represents
the top of the . . . . . . boiler to which the apparatus is bolted,
with the tube A containing the fusible alloy, projecting into the
interior of the Boiler, as also does the lower end of the valve
cock, as seen at O.
The operation of the above described apparatus is as follows.
The fusible alloy E. is so made as to melt at a temperature a
little above the regular working temperature of the steam in
the Boiler. That is to say if in a high pressure boiler the safety valve is made to operate at a hundred and fifty pounds pressure on the square inch: the alloy should fuse at a temperature corresponding to about one hundred and sixty pounds. and in a low pressure or condensing engine supposing it calculated to work at a pressure of ten or fifteen pounds. the alloy should fuse at a temperature corresponding thereto say at about fourteen or nineteen pounds. — When the temperature of the steam in the Boiler is such as to fuse the alloy. the piece G descends into it and allows the weight to fall upon the top of the stem P. which forces open the valve O. and lets the steam escape up thro the valve cock which it will do with considerable noise. and the attention of the Engineer will thus be called to the increased temperature of the boiler. which may be caused either by the pressure of the steam being too high or by the water therein being too low.

The Engineer will then proceed to examine the safty valve to see that it works freely. and the gauge cocks to try the hight of the water he will then know from which of the two causes the alloy has fused. and proceed to correct the evil. It may however so happen on-board of Steam Boats that the guage cocks will show plenty of water and the safety valve be not overloaded altho' the alloy has fused; in that case it would appear that the boilers were not level. and that some part of the back end of them was acted on by the fire without having water in contact with it.

Figure 4:
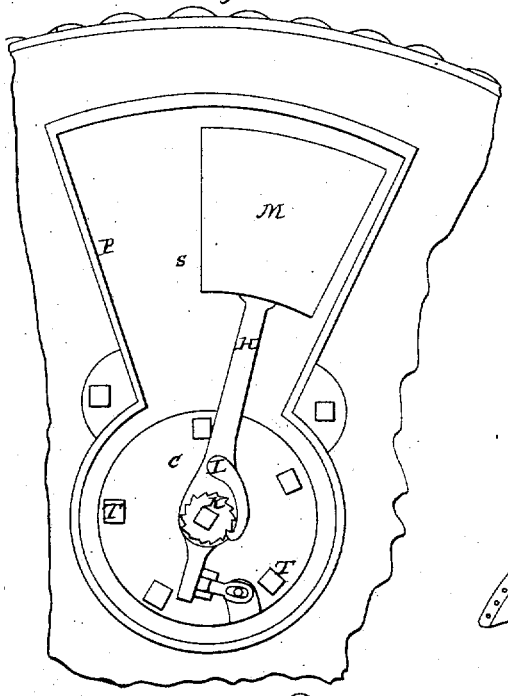
Figure 3:
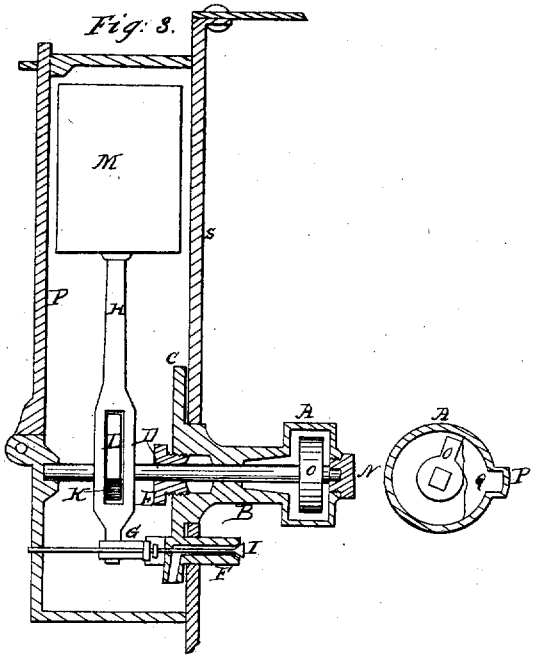
Figure 2:
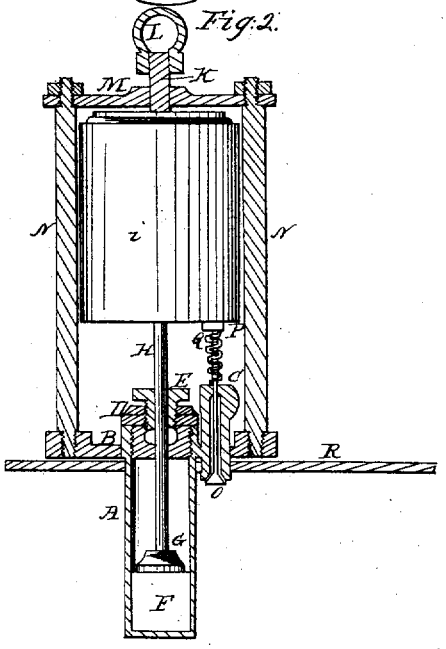

It would on this account be advisable to place two of the above described apparatus, on each Boiler. one to contain an alloy fusible as above. the other an alloy that will melt at a temperature a little higher. so that the Engineer may know. whether the temperature of the Boiler is increasing or not; for should the alloy fuse in the second apparatus also he will then know that he has not been able to correct the evil and must therefore put out the fire. The above described apparatus ought to be enclosed in a cast iron or other metallic cover under lock and key so that the Engineer cannot get at it the key being kept by the Captain or other person whose duty it will be to raise the weight when the
apparatus has gone into operation and to place the forked piece S be-
tween the guard and the handle so that the alloy may congeal in
its place, and be ready for another operation, the fork is then to
be removed and the box locked. Fig 3 represents a sectional
view of another modification of this machine and fig 4 is a front
view of it as it appears on the outside of the boiler head.
A is a hollow metallic cylinder, the interior of which is about
one inch long and about two inches in diameter. and it may be
about one eighth of an inch thick. B is a round part of the
same piece of metal about two and half inches long connecting
the cylinder to the flanch C. which is about five inches in
diameter and three eighths thick. The interior of B is in the form
of the frustrum of a cone, the base of which joins the cylinder
A. the diameter being about one inch and extending towards
the flanch about one and a quarter inch where it is about three
quarters of an inch in diameter. This part of the interior of B.
is mde conical for the purpose of preventing the alloy which
is placed in A from getting towards the flanch. The above descri
bed form of the interior of A + B may be given to it in the casting by
means of a core; and that part which forms the hole thro'
which the shaft D passes may be drilled as also may the cavity
to secure the plug E. and form the stuffing Box F in a valve
cock similar to that in the first described apparatus. G is a
small lever the arms of which are at right angles to each other
one laying across and a little above the lever H. the other stand-
ing upright and having the stem of the valve I. passing thro'
it. on this stem are screwed two small round pieces of metal
about half an inch in diameter. one of them being placed between
the small lever and the flanch. and the other on the opposite
side of the lever. The one on the side next the flanch is
to receive the pressure of the lever to open the valve. the other is
to shut it, as the back of the small lever presses against it.

8185X 5-8-1834 when the alloy is unfused, as at that time the lever H does not tou
it. The lever H is enlarged at that part where the shaft pas
ses thro' it. and has an oblong slot cast into it to receive the
ratchet wheel K. This ratchet wheel is fastened to and prevented
from turning on the shaft by means of a square on the shaft
which is between the two cheeks or sides of the lever H
L. is a ratchet or pall which catches in the teeth of the ratchet
wheel and causes the shaft to turn with it when the alloy has
fused. about four inches from the shaft on the lever H is fastened
the weight M which may weigh about eight pounds.
On and near the end of the shaft which is in the cylinder A. I place
an arm O. of brass or iron, one and three quarters of an inch long &
three eighths square. this arm should be first made and then mould
ed in the core that forms the interior of A. N. is a plug of brass
or iron screwed into the cylinder A. in this plug is formed a place
for the journal of the shaft to work in. the hole in which the plug
is screwed is also for the purpose of getting at the arm, to put it
on the shaft. The shaft may be made to extend to the casing P.
and the valve stem may be made to extend to, and passed thro the
casing. as shown in the drawing, in that case the valve cock can
be used at all times as a common guage cock. Q is a fusible
alloy placed in the cylinder A. The deviation from a true cylinder
as shown at R. is for the purpose of preventing the alloy from turn
ing in the cylinder. S is the Boiler head. T.T. are the screw
bolts that secure the fixture to the boiler head. A.B. and the
valve end of cock, are the parts of this apparatus which project in
to the boiler. The op ation of the machine as thus modified
is as follows. When the alloy fuses. the arm O being no long
er supported or prevented from turning, the weight is allowed
to descend which causes the end of lever H. to press against the small
lever G. this causes the upright end of said lever to press against
the small brass pin in the valve stem, which forces open the valve
I and allows the steam to escape. and the Engineer receives no
tice as in the first described apparatus. In this modification of the machine it makes no difference whether the alloy congeals around the arm in the cylinder or not. as it can be set for another operation at any time; for should the metal become hard while the arm is in it it will only be necessary to raise the weight and the ratchet will take a new hold on the ratchet wheel.

I have thus described two methods. by which I intend to carry my improvement in the mode of applying fusible alloy in effect. which improvement I do hereby declare consists in the employment of an air tight tube or vessel to contain the alloy by which it will be preserved from oxidation or waste for a great length of time. and in which it can be used many times in succession for indicating a certain elevation of temperature without the necessity of renewing it. avoiding thereby the inconvenience and danger incident to the modes heretofore practised in the employment of it. I therefore claim the using of such alloy in the manner or upon the principle herein set forth whether the same be effected by ... means of instruments constructed exactly in the form described or in any other in which a similar effect is produced by analogous means Exd Witnesses Cadwallader Evans.

W.H. Mich Kelly

J Badger. Drawing (2379 words)